(12) United States Patent
Mitadera et al.

(10) Patent No.: US 7,927,678 B2
(45) Date of Patent: Apr. 19, 2011

(54) MULTILAYER BOTTLE

(75) Inventors: Jun Mitadera, Kanagawa (JP);
Tomomichi Kanda, Kanagawa (JP);
Kazunobu Maruo, Kanagawa (JP);
Masashi Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 484 days.

(21) Appl. No.: 12/158,504

(22) PCT Filed: Dec. 21, 2006

(86) PCT No.: PCT/JP2006/325520
§ 371 (c)(1),
(2), (4) Date: Jun. 20, 2008

(87) PCT Pub. No.: WO2007/072917
PCT Pub. Date: Jun. 28, 2007

(65) Prior Publication Data
US 2009/0277858 A1 Nov. 12, 2009

(30) Foreign Application Priority Data
Dec. 22, 2005 (JP) .................. 2005-369759

(51) Int. Cl.
*B32B 27/08* (2006.01)
(52) U.S. Cl. .................. 428/36.7; 428/35.7; 428/36.6; 428/36.9; 428/36.91; 428/35.9; 428/474.4; 428/475.2; 428/480
(58) Field of Classification Search ............... 428/35.7, 428/36.6, 36.7, 36.9, 36.91, 35.9, 474.4, 428/475.2, 480
See application file for complete search history.

(56) References Cited

U.S. PATENT DOCUMENTS
2005/0142309 A1   6/2005   Goto et al.

FOREIGN PATENT DOCUMENTS

| EP | 1 034 910 A1 | 9/2000 |
|---|---|---|
| EP | 1 354 906 | 10/2003 |
| EP | 1 405 874 | 4/2004 |
| EP | 1 449 646 | 8/2004 |
| EP | 1 475 308 | 11/2004 |
| EP | 1 902 838 | 3/2008 |
| JP | 01-294426 | 11/1989 |
| JP | 2000-254963 | 9/2000 |
| JP | 2001-206336 | 7/2001 |
| JP | 2002-210887 | 7/2002 |
| JP | 2004-160935 | 6/2004 |

OTHER PUBLICATIONS

Extended European Search Report, including Supplementary European Search Report and European Search Opinion, dated Feb. 17, 2010, for Application No. EP 06 83 5086.

*Primary Examiner* — Michael C Miggins
(74) *Attorney, Agent, or Firm* — Antonelli, Terry, Stout & Kraus, LLP.

(57) ABSTRACT

There is provided a multilayer bottle including an outermost layer and an innermost layer which are each made of a thermoplastic polyester resin, and at least one barrier layer interposed between the outermost layer and the innermost layer. The barrier layer contains at least two components including a polyamide obtained by polycondensing a diamine component containing m-xylylenediamine as a main component with a dicarboxylic acid component containing an α,ω-linear aliphatic dicarboxylic acid as a main component, and a thermoplastic resin having a lower molecular weight than that of the polyamide. The multilayer bottle hardly suffers from delamination upon impact or dropping and, therefore, is not required to have a shape with less irregularities or less bends for preventing the delamination, and further has a large freedom of design choice.

12 Claims, No Drawings

MULTILAYER BOTTLE

TECHNICAL FIELD

The present invention relates to techniques for preventing delamination of multilayer bottles having an excellent gas-barrier property, and more particularly to techniques for preventing multilayer bottles from undergoing delamination even when exposed impact upon filling contents thereinto, upon transportation or upon dropping by improving an interlaminar bonding strength between an innermost or outermost layer and an intermediate layer formed therebetween. In addition, the present invention relates to multilayer bottles which are free from delamination between these layers even without forming the bottles into a shape with less irregularities and less bends, and have a large freedom of design choice.

BACKGROUND ART

At present, plastic containers (bottles, etc.) made mainly of polyesters such as polyethylene terephthalate (PET) have been extensively used as containers for teas, fruit juices, carbonated beverages, etc. Among these plastic containers, plastic bottles of a small size have increased in proportion year by year. In general, as the size of a bottle is reduced, a surface area thereof per unit volume of contents therein tends to increase. Therefore, a gustoish period of contents in the small-size bottles tends to be shortened. In recent years, beer susceptible to influences of oxygen and light as well as hot tea which are filled in a plastic bottle have been put on the market. Thus, with the recent tendency that the plastic containers are used in more extensive applications, the plastic containers have been required to be further improved in gas-barrier property.

To meet the above requirement for imparting a good gas-barrier property to plastic bottles, there have been developed multilayer bottles produced from a thermoplastic polyester resin and a gas-barrier resin, blend bottles, barrier-coated bottles produced by forming a carbon coat, a deposited coat or a barrier resin coat onto a single layer bottle made of a thermoplastic polyester resin, etc.

The multilayer bottles, for example, those bottles produced by subjecting a three- or five-layer preform (parison) obtained by injecting a thermoplastic polyester resin such as PET for forming innermost and outermost layers thereof and a thermoplastic gas-barrier resin such as poly-m-xylyleneadipamide (polyamide MXD6) into a mold cavity, to biaxial stretch blow molding, have been put into practice.

Further, resins having an oxygen-capturing function which are capable of capturing oxygen within a container while preventing penetration of oxygen into the container from outside have been developed and applied to multilayer bottles. The oxygen-capturing bottles are suitably in the form of a multilayer bottle including a gas-barrier layer made of polyamide MXD6 in which a transition metal-based catalyst is blended, from the viewpoints of oxygen-absorbing rate, transparency, strength, moldability, etc.

The above multilayer bottles have been used as containers for beer, tea, carbonated beverages, etc., because of their good gas-barrier property. When the multilayer bottles are used in these applications, contents filled therein can maintain a good quality with an improved shelf life. On the other hand, the multilayer bottles tend to undergo delamination between different resin layers, for example, between the innermost or outermost layer and the intermediate layer, resulting in significant damage to their commercial value.

To solve the above problems, there has been proposed such a method in which when a resin for forming the innermost and outermost layers is finally injected into a mold cavity, a given amount of the resin is allowed to flow black in the reverse direction toward the side of the intermediate gas-barrier layer using a reverse-flow controller to produce a preform containing a coarse mixed resin introduced between the layers, thereby improving a delamination resistance of the resultant multilayer bottle (refer to Patent Document 1). However, in this method, it is required to use the special apparatus. Also, there has been proposed the method for producing a multilayer bottle by a stretch blow molding method in which a preform once blow-molded is contracted under heating and then subjected again to blow molding under a high pressure (refer to Patent Document 2). However, in this method, there tend to occur problems such as defective shape of the resultant molded product, complicated time-consuming procedure and deteriorated delamination resistance.

Patent Document 1: JP 2000-254963A
Patent Document 2: JP 2001-206336A

DISCLOSURE OF THE INVENTION

An object of the present invention is to solve the above conventional problems, and provide a multilayer bottle that is free from occurrence of delamination upon dropping or upon exposure to impact, need not be formed into specific shapes with less irregularities or less bends for inhibiting the delamination, and has a large freedom of design choice.

As the result of extensive and intensive researches concerning delamination resistance of multilayer bottles, the present inventors have found that when forming a barrier layer having a specific composition, an impact energy applied to the barrier layer is well reduced, and the resultant multilayer bottle is improved in interlaminar bonding strength and prevented from suffering from delamination upon dropping, etc. The present invention has been accomplished on the basis of the above finding.

Thus, the present invention relates to a multilayer bottle including an outermost layer, an innermost layer and at least one barrier layer interposed between the outermost layer and the innermost layer, wherein the outermost layer and the innermost layer are each made mainly of a polyester (A) obtained by polymerizing a dicarboxylic acid component containing 80 mol % or more of terephthalic acid with a diol component containing 80 mol % or more of ethylene glycol; and the barrier layer includes at least a polyamide (B) obtained by polycondensing a diamine component containing 70 mol % or more of m-xylylenediamine with a dicarboxylic acid component containing 70 mol % or more of an $\alpha\omega$,-linear aliphatic dicarboxylic acid having 4 to 20 carbon atoms, and a thermoplastic resin (C) whose number-average molecular weight is from 10 to 65% of a number-average molecular weight of the polyamide (B).

BEST MODE FOR CARRYING OUT THE INVENTION

The thermoplastic polyester resin used for forming an outermost layer, an innermost layer and optionally a part of an intermediate layer of the multilayer bottle according to the present invention is a polyester resin (hereinafter referred to merely as a "polyester (A)") which is obtained by polymerizing a dicarboxylic acid component containing terephthalic acid in an amount of 80 mol % or more and preferably 90 mol % or more (inclusive of 100 mol %) with a diol component containing ethylene glycol in an amount of 80 mol % or more and preferably 90 mol % or more (inclusive of 100 mol %).

The polyester (A) used in the present invention is preferably polyethylene terephthalate because the polyethylene terephthalate is excellent in all of transparency, mechanical strength, injection moldability and stretch blow moldability.

Examples of dicarboxylic acids other than terephthalic acid which may be contained in the dicarboxylic acid component include isophthalic acid, diphenyl ether-4,4-dicarboxylic acid, naphthalene-1,4-dicarboxylic acid, naphthalene-2,6-dicarboxylic acid, adipic acid, sebacic acid, decane-1,10-dicarboxylic acid and hexahydroterephthalic acid. Examples of diols other than ethylene glycol which may be contained in the diol component include propylene glycol, 1,4-butanediol, neopentyl glycol, diethylene glycol, cyclohexane dimethanol, 2,2-bis(4-hydroxyphenyl)propane and 2,2-bis(4-hydroxyethoxyphenyl)propane. Further, oxy acids such as p-oxybenzoic acid may also be used as a raw monomer of the polyester (A).

The polyester (A) preferably has an intrinsic viscosity of from 0.55 to 1.30 and more preferably from 0.65 to 1.20. When the polyester (A) has an intrinsic viscosity of 0.55 or more, it is possible to produce not only a transparent amorphous multilayer preform but also a multilayer bottle having a satisfactory mechanical strength. Also, the polyester (A) having an intrinsic viscosity of 1.30 or less is free from deterioration in fluidity upon molding, resulting in facilitated production of a multilayer bottle.

Further, the polyester (A) from which the outermost or innermost layer of the multilayer bottle is mainly formed may also be blended with other thermoplastic resins or various additives unless the addition thereof adversely affects the aimed effects of the present invention. The outermost or innermost layer preferably contains the polyester (A) in an amount of 90% by weight or more (inclusive of 100% by weight). Examples of the other thermoplastic resins include thermoplastic polyester resins such as polyethylene-2,6-naphthalenedicarboxylate, polyolefin-based resins, polycarbonates, polyacrylonitrile, polyvinyl chloride and polystyrene. Examples of the additives include ultraviolet absorbers, oxygen absorbers, colorants, and infrared absorbers (reheating additives) for accelerating heating of the preform and shortening a cycle time upon molding.

The oxygen transmission rate (OTR) of the barrier layer formed in the multilayer bottle of the present invention as measured at a temperature of 23° C. and a relative humidity (RH) of 60% is preferably 0.2 cc·mm/(m² day atm) or less, more preferably 0.15 cc mm/(m² day atm) or less, still more preferably 0.10 cc mm/(m² day atm) or less and further still more preferably 0.08 cc mm/(m² day atm) or less on the average. When the OTR of the barrier layer lies within the above-specified range, the obtained multilayer bottle exhibits a good gas-barrier property and is capable of prolonging a consumable date of contents to be preserved therein.

In the multilayer bottle of the present invention, the barrier layer is preferably made of a blended mixture containing at least two components including a polyamide (B) obtained by polycondensing a diamine component containing 70 mol % or more (inclusive of 100 mol %) of m-xylylenediamine with a dicarboxylic acid component containing 70 mol % or more (inclusive of 100 mol %) of an α,ω-linear aliphatic dicarboxylic acid having 4 to 20 carbon atoms, and a thermoplastic resin (C) whose number-average molecular weight is from 10 to 65% of a number-average molecular weight of the polyamide (B). When blending the polyamide (B) with the thermoplastic resin (C) having a lower molecular weight than that of the polyamide (B), the resultant barrier layer is improved in flexibility and interlaminar bonding strength and exhibits a good delamination resistance.

The polyamide (B) used in the present invention has a high barrier property and exhibits excellent properties including co-injection moldability and co-stretch blow moldability when molded together with the polyester (A) (mainly polyethylene terephthalate).

The diamine unit contained in the polyamide (B) contains a m-xylylenediamine unit in an amount of 70 mol % or more, preferably 75 mol % or more and more preferably 80 mol % or more. When the content of the m-xylylenediamine unit in the diamine unit is less than 70 mol %, the obtained polyamide (B) tends to be deteriorated in gas-barrier property. Examples of diamines other than m-xylylenediamine which may be used in the diamine unit include, but are not limited to, aliphatic diamines such as tetramethylenediamine, pentamethylenediamine, 2-methyl pentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis (aminomethyl)tricyclodecane; and aromatic ring-containing diamines such as bis(4-aminophenyl)ether, p-phenylenediamine, p-xylylenediamine and bis(aminomethyl)naphthalene.

The dicarboxylic acid unit contained in the polyamide (B) contains an α,ω-linear aliphatic dicarboxylic acid unit having 4 to 20 carbon atoms in an amount of 70 mol % or more, preferably 75 mol % or more, and more preferably 80 mol % or more. When the content of the α,ω-linear aliphatic dicarboxylic acid unit in the dicarboxylic acid unit lies within the above-specified range, the resultant polyamide exhibits excellent gas-barrier property and moldability. Examples of the α,ω-linear aliphatic dicarboxylic acid having 4 to 20 carbon atoms which may be used in the present invention include aliphatic dicarboxylic acids such as succinic acid, glutaric acid, pimelic acid, suberic acid, azelaic acid, adipic acid, sebacic acid, undecanedioic acid and dodecanedioic acid. Among these α,ω-linear aliphatic dicarboxylic acids, preferred is adipic acid.

In the present invention, an aromatic dicarboxylic acid such as, for example, terephthalic acid, isophthalic acid and 2,6-naphthalenedicarboxylic acid may also be added as the dicarboxylic acid other than the α,ω-linear aliphatic dicarboxylic acid in an amount of less than 30 mol %.

Further, a small amount of a molecular weight controller such as monoamines and monocarboxylic acids may also be added upon the polycondensation for production of the polyamide. The dicarboxylic acid component used in the present invention preferably contains from 100 to 70 mol % of the α,ω-linear aliphatic dicarboxylic acid having 4 to 20 carbon atoms, and not less than 0 but less than 30 mol % of the other aromatic dicarboxylic acids.

The polyamide (B) may be produced by a melt-polycondensation method. For example, the polyamide (B) may be produced by the method of heating a nylon salt obtained from m-xylylenediamine and adipic acid under pressure in the presence of water, and polymerizing the salt kept in a molten state while removing water added and condensed water as produced, therefrom. Alternatively, the polyamide (B) may also be produced by the method of directly adding m-xylylenediamine to adipic acid kept in a molten state to subject these compounds to polycondensation under normal pressures. In the latter polycondensation method, in order to keep the reaction system in a uniform liquid state, m-xylylenediamine is continuously added to adipic acid, and the polycondensation reaction therebetween proceeds while heating the reaction system to a temperature not less than the melting points of oligoamide and polyamide produced.

The polyamide (B) may also be produced by further subjecting the polyamide obtained by the melt-polycondensation to solid-state polymerization. The method for producing the polyamide is not particularly limited, and the polyamide may be produced by using the conventionally known methods and polymerization conditions.

The number-average molecular weight of the polyamide (B) is preferably from 18000 to 43500 and more preferably from 20000 to 30000. When the number-average molecular weight of the polyamide (B) lies within the above specified range, a moldability of the resin material upon forming a multilayer bottle is enhanced, and the resultant multilayer bottle exhibits an excellent delamination resistance. Meanwhile, the polyamide (B) having a number-average molecular weight of from 18000 to 43500 exhibits a relative viscosity of about 2.3 to about 4.2, and the polyamide (B) having a number-average molecular weight of from 20000 to 30000 exhibits a relative viscosity of about 2.44 to about 3.19. The relative viscosity used herein means the value obtained by measuring a viscosity of a solution prepared by dissolving 1 g of the polyamide in 100 ml of a 96% sulfuric acid, at 25° C. by using a Cannon-Fenske viscometer, etc.

The polyamide (B) may also contain a phosphorus compound in order to enhance a processing stability upon melt-molding or prevent undesired coloration of the polyamide (B). Examples of the phosphorus compound include phosphorus compounds containing alkali metals or alkali earth metals. Specific examples of the phosphorus compound include phosphates, hypophosphites and phosphites of alkali metals or alkali earth metals such as sodium, magnesium and calcium. Among these phosphorus compounds, hypophosphites of alkali metals or alkali earth metals are preferably used because they are excellent, in particular, in the effect of preventing coloration of the polyamide. The concentration of the phosphorus compound added to the polyamide (B) is preferably from 1 to 500 ppm, more preferably 350 ppm or less and still more preferably 200 ppm or less in terms of phosphorus atom on the basis of the polyamide (B). Even when the concentration of phosphorus atom added exceeds 500 ppm, the effect of preventing coloration of the polyamide is no longer enhanced, and rather a haze of a film obtained from the polyamide tends to be undesirably increased.

The number-average molecular weight of the thermoplastic resin (C) is preferably from 10 to 65% and more preferably from 20 to 50% of the number-average molecular weight of the polyamide (B). When number-average molecular weight of the thermoplastic resin (C) lies within the above specified range, a moldability of the resin material upon forming a multilayer bottle is enhanced. Further, the obtained barrier layer exhibits a good followability to the skin layers (innermost and outermost layers) when impact is applied to the resultant multilayer bottle, resulting in an excellent delamination resistance of the bottle. In addition, when the number-average molecular weight of the thermoplastic resin (C) lies within the above specified range, the thermoplastic resin (C) having a lower modulus than that of the polyamide (B) exhibits a good dispersibility in the barrier layer, resulting in excellent effect of improving a delamination resistance of the resultant bottle.

The flexural modulus of the thermoplastic resin (C) is preferably from 30 to 80% of a flexural modulus of the polyamide resin (B) as both measured according to ASTM D790. When the flexural modulus of the thermoplastic resin (C) lies within the above specified range, the obtained barrier layer has a good flexibility and, therefore, exhibits a good followability to the skin layers, resulting in excellent delamination resistance of the resultant multilayer bottle. The flexural modulus of the polyamide (B) is preferably from 3 to 5 GPa.

The thermoplastic resin (C) may be made of a single kind of resin or a blended mixture of a plurality of resins. The thermoplastic resin (C) is not particularly limited, and preferably selected from those resins capable of exhibiting a good transparency when blended with the polyamide (B). Examples of the thermoplastic resin (C) include polyesters, polyamides, phenoxy resins in the form of a polyhydroxy ether having an α-glycol group at one or both terminal ends thereof, polyglycolic acids and various elastomers.

Among these resins as the thermoplastic resin (C), the phenoxy resins in the form of a polyhydroxy ether having an α-glycol group at one or both terminal ends thereof are especially preferred, because a blended mixture of the thermoplastic resin (C) and the polyamide (B) exhibits an excellent transparency when stretched, and the resultant multilayer bottle exhibits an excellent delamination resistance owing to a good interaction between the polyamide (B) and the polyester (A) which is exerted by the hydroxyl groups contained in a molecular chain of the polyhydroxy ether.

Also, the polyglycolic acids are preferably used as the thermoplastic resin (C). The polyglycolic acids are in the form of a polymer containing a repeating unit represented by the formula: [—O—CH$_2$—CO—]. The content of the repeating unit in the polyglycolic acids is preferably 60% by weight or more, more preferably 70% by weight or more and still more preferably 80% by weight or more. Examples of repeating units other than the above repeating unit [—O—CH$_2$—CO—] which may be contained in the polyglycolic acids include —O—(CH$_2$)$_n$—O—CO—(CH$_2$)$_m$—CO— wherein n is a number of from 1 to 10, and m is a number of from 0 to 10; —O—CH[(CH$_2$)$_j$H]—CO— wherein j is a number of from 1 to 10; —O—(CR$^1$R$^2$)$_k$—CO— wherein R$^1$ and R$^2$ are each independently a hydrogen atom or an alkyl group having 1 to 10 carbon atoms; and k is a number of from 2 to 10; —O—CH$_2$—CH$_2$—CH$_2$—O—CO—; and —O—CH$_2$—O—CH$_2$—CH$_2$—. The polyglycolic acids may be controlled in melting point, molecular weight and viscosity by introducing these repeating units thereinto.

The thermoplastic resin (C) is especially preferably a polyamide because of excellent transparency of a blended mixture thereof with the polyamide (B) when stretched as well as excellent compatibility with the polyamide (B). Examples of the polyamide usable as the thermoplastic resin (C) include, but are not particularly limited to, homopolymers such as poly(6-aminohexanoic acid) (PA-6) also known as poly(caprolactam), poly(hexamethyleneadipamide) (PA-6,6), poly(7-aminoheptanoic acid) (PA-7), poly(10-aminodecanoic acid) (PA-10), poly(11-aminoundecanoic acid) (PA-11), poly(12-aminododecanoic acid) (PA-12), poly(hexamethylenesebacamide) (PA-6,10), poly(hexamethyleneazelamide) (PA-6,9) and poly(tetramethyleneadipamide) (PA-4,6); aliphatic polyamides such as caprolactam/hexamethyleneadipamide copolymer (PA-6,6/6), hexamethyleneadipamide/caprolactam copolymer (PA-6/6,6) and poly(m-xylyleneadipamide) (PA-MXD6); and amorphous semi-aromatic polyamides such as poly(hexamethyleneisophthalamide) (PA-6I), hexamethylenisophthalamide/hexamethylenephthalamide copolymer (PA-6I/6T), poly(m-xylyleneisophthalamide) (PA-MXDI), caprolactam/m-xylyleneisophthalamide copolymer (PA-6/MXDI) and caprolactam/hexamethyleneisophthalamide copolymer (PA-6/6I).

The thermoplastic resin (C) used in the present invention is preferably a polyamide oligomer or a low-molecular weight polyamide which is obtained by polycondensing a diamine component containing 70 mol % or more (inclusive of 100 mol %) of m-xylylenediamine with a dicarboxylic acid component containing 50 mol % or more (inclusive of 100 mol %) of an α,ω-linear aliphatic dicarboxylic acid having 4 to 20 carbon atoms.

The method of blending the polyamide (B) with the thermoplastic resin (C) is not particularly limited. The polyamide (B) and the thermoplastic resin (C) may be dry-blended with each other upon production of a preform of the bottle. Alternatively, the polyamide (B) and the thermoplastic resin (C) may be melt-blended with each other using a single-screw extruder, a twin-screw extruder, etc., prior to production of a preform of the bottle, or may be melt-blended with each other to prepare a master batch composed of these resins.

The barrier layer is preferably made mainly of the polyamide (B). From the viewpoint of a good barrier property, the content of the polyamide (B) in the barrier layer is more preferably 70% by weight or more and still more preferably 80% by weight or more. Depending upon kinds of resins or the like to be added to the polyamide (B), if the content of the resins or the like in the barrier layer is more than 30% by weight, the above OTR of the barrier layer tends to exceed 0.2 cc mm/(m²·day·atm), resulting in deteriorated barrier property thereof.

In the present invention, the content of the thermoplastic resin (C) in the barrier layer is preferably from 1 to 20% by weight, more preferably from 2 to 15% by weight and still more preferably from 2 to 10% by weight on the basis of the weight of the barrier layer. When the content of the thermoplastic resin (C) in the barrier layer lies within the above specified range, a moldability of the resin material upon forming a multilayer bottle is enhanced, and the resultant multilayer bottle exhibits an excellent delamination resistance.

The thermoplastic resin (C) is dispersed in the barrier layer, for example, in the form of a disc shape whose central portion has a larger thickness than that of a peripheral portion thereof (discus shape), an islands shape, a short bar shape or a flat Rugby ball shape. The shape (area, major axis and minor axis) of individual domains of the thermoplastic resin (C) dispersed in the barrier layer as viewed in section of the barrier layer preferably satisfies the following requirements (1) to (3):

Area(average value)<0.054 μm² (1)

Major axis(average value)<0.6 μm (2)

Minor axis(average value)<0.09 μm (3).

The area, major axis and minor axis may be measured by observing a section of an ultrathin cut piece having a thickness of about 0.1 μm which is horizontally cut out of the upright multilayer bottle, from a vertical direction of the upright multilayer bottle, by using a microscope. In the multilayer bottle of the present invention, the thermoplastic resin (C) is usually dispersed in the barrier layer in the form of a flat plate shape owing to stretching of the barrier layer. Therefore, when observing the barrier layer from a vertical direction of the uptight multilayer bottle, the shape of individual domains of the thermoplastic resin (C) dispersed therein satisfies the above requirements (1) to (3). The area of individual domains of the thermoplastic resin (C) dispersed in the barrier layer is more preferably from 0.01 to 0.054 μm², the major axis thereof is more preferably not less than 0.1 μm but less than 0.6 μm, and the minor axis thereof is more preferably not less than 0.01 μm but less than 0.09 μm. The ratio of the major axis to the minor axis (major axis/minor axis) is preferably from 1.1 to 100, more preferably from 2 to 50 and still more preferably from 3 to 10.

When the shape of individual domains of the thermoplastic resin (C) dispersed in the barrier layer satisfies the above requirements, an impact energy applied to the bottle is readily reduced inside of the barrier layer, and readily absorbed by the thermoplastic resin (C) dispersed therein. As a result, the obtained multilayer bottle exhibits an excellent delamination resistance.

In addition, the barrier layer may also contain a resin (D) other than the polyamide (B) or the thermoplastic resin (C), for example, one or plural kinds of resins such as nylon 6, nylon 66, nylon 6,66, nylon 6I/6T, polyesters, polyolefins and phenoxy resins unless the addition of these resins adversely affects the aimed effects of the present invention. In addition, the barrier layer may also contain various additives. Examples of the additives include inorganic fillers such as glass fibers and carbon fibers; plate-shaped inorganic fillers such as glass flakes, talc, kaolin, mica, montmorillonite and organized clay; impact modifiers such as various elastomers; nucleating agents; lubricants such as fatty amide-based compounds, and fatty acid metal salt-based compounds; antioxidants such as copper compounds, organic or inorganic halogen-based compounds, hindered phenol-based compounds, hindered amine-based compounds, hydrazine-based compounds, sulfur-based compounds and phosphorus-based compounds; heat stabilizers; anti-coloring agents; ultraviolet absorbers such as benzotriazole-based compounds; mold release agents; plasticizers; colorants; flame retardants; compounds capable of imparting an oxygen scavenging function to the barrier layer such as cobalt-containing compounds; and alkali compounds capable of preventing gelation of polyamides.

The multilayer bottle of the present invention might sometimes have portions having a low stretch ratio (from 1 to 2.5 times) depending upon a shape of the preform or bottle. The portions having such a low stretch ratio tends to be whitened when water is absorbed therein. Therefore, if required, an anti-whitening agent may be added to the barrier layer to prevent whitening of the barrier layer, thereby enabling production of a multilayer bottle having a good transparency.

The anti-whitening agent is made of an aliphatic acid metal salt having 18 to 50 carbon atoms and preferably 18 to 34 carbon atoms. The aliphatic acid metal salt having 18 or more carbon atoms is expected to show a good anti-whitening effect, whereas the aliphatic acid metal salt having 50 or less carbon atoms is uniformly dispersed in the barrier layer. The aliphatic acid may be branched or may have double bonds. Examples of the preferred aliphatic acids include linear saturated aliphatic acids such as stearic acid (C18), eicosanoic acid (C20), behenic acid (C22), montanoic acid (C28) and triacontanoic acid (C30). Examples of the metals capable of forming a salt with these aliphatic acids include, but are not limited to, sodium, potassium, lithium, calcium, barium, magnesium, strontium, aluminum and zinc. Of these metals, preferred are sodium, potassium, lithium, calcium, aluminum and zinc.

The aliphatic acid metal salts may be used singly or in combination of any two or more thereof. In the present invention, although the particle size of the aliphatic acid metal salts is not particularly limited, the aliphatic acid metal salts preferably have a particle size of 0.2 mm or smaller since such small particles are readily uniformly dispersed in the barrier layer.

The amount of the aliphatic acid metal salt added is preferably from 0.005 to 1.0 part by weight, more preferably from 0.05 to 0.5 part by weight and still more preferably from 0.12 to 0.5 part by weight on the basis of 100 parts by weight of a total amount of the barrier layer. When the amount of the aliphatic acid metal salt added to the barrier layer is 0.005 part by weight or more on the basis of 100 parts by weight of the total amount of the barrier layer, it is expected that the barrier layer exhibits a good anti-whitening effect. When the amount of the aliphatic acid metal salt added to the barrier layer is 1.0 part by weight or less on the basis of 100 parts by weight of the total amount of the barrier layer, the resultant multilayer bottle maintains a low haze.

Alternatively, a compound selected from the group consisting of the following diamide compounds and diester compounds may be added as the anti-whitening agent in place of the above aliphatic acid metal salt. The diamide compounds and the diester compounds may be respectively added singly or in the form of a mixture of any two or more thereof, or the one or more diamide compounds may be used in combination with the one or more diester compounds.

The diamide compounds may be produced by reacting an aliphatic acid having 8 to 30 carbon atoms with a diamine having 2 to 10 carbon atoms. The diamide compounds obtained from an aliphatic acid having 8 or more carbon atoms and a diamine having 2 or more carbon atoms are expected to show a good anti-whitening effect, whereas the diamide compounds obtained from an aliphatic acid having 30 or less carbon atoms and a diamine having 10 or less carbon atoms are uniformly dispersed in the barrier layer. The aliphatic acids may be branched or may have double bonds. Of these aliphatic acids, preferred are linear saturated aliphatic acids.

Examples of the aliphatic acid component of the diamide compounds include stearic acid (C18), eicosanoic acid (C20), behenic acid (C22), montanoic acid (C28) and triacontanoic acid (C30). Examples of the diamine component of the diamide compounds include ethylenediamine, butylenediamine, hexanediamine, xylylenediamine and bis(aminomethyl)cyclohexane. In the present invention, the diamide compounds produced from combination of these components may be suitably used. Of these diamide compounds, preferred are diamide compounds obtained from an aliphatic acid having 8 to 30 carbon atoms and a diamine composed mainly of ethylenediamine, and diamide compounds obtained from an aliphatic acid composed mainly of montanoic acid and a diamine having 2 to 10 carbon atoms.

The diester compounds may be produced by reacting an aliphatic acid having 8 to 30 carbon atoms with a diol having 2 to 10 carbon atoms. The diester compounds obtained from an aliphatic acid having 8 or more carbon atoms and a diol having 2 or more carbon atoms are expected to show a good anti-whitening effect, whereas the diester compounds obtained from an aliphatic acid having 30 or less carbon atoms and a diol having 10 or less carbon atoms are uniformly dispersed in the barrier layer. The aliphatic acids may be branched or may have double bonds. Of these aliphatic acids, preferred are linear saturated aliphatic acids.

Examples of the aliphatic acid component of the diester compounds include stearic acid (C18), eicosanoic acid (C20), behenic acid (C22), montanoic acid (C28) and triacontanoic acid (C30). Examples of the diol component of the diester compounds include ethylene glycol, propanediol, butanediol, hexanediol, xylylene glycol and cyclohexane dimethanol. In the present invention, the diester compounds produced from combination of these components may be suitably used. Of these diester compounds, preferred are diester compounds obtained from an aliphatic acid composed mainly of montanoic acid and a diol composed mainly of ethylene glycol and/or 1,3-butanediol.

The amount of the diamide compound and/or the diester compound added is preferably from 0.005 to 1.0 part by weight, more preferably from 0.05 to 0.5 part by weight and still more preferably from 0.12 to 0.5 part by weight on the basis of 100 parts by weight of the total amount of the barrier layer. When the amount of the diamide compound and/or the diester compound added to the barrier layer is 0.005 part by weight or more on the basis of 100 parts by weight of the total amount of the barrier layer, it is expected that the barrier layer exhibits a good anti-whitening effect. When the amount of the diamide compound and/or the diester compound added to the barrier layer is 1.0 part by weight or less on the basis of 100 parts by weight of the total amount of the barrier layer, the resultant multilayer bottle maintains a low haze.

The anti-whitening agent may be added to the barrier layer by conventionally known mixing methods. For example, pellets of the polyamide (B) and the anti-whitening agent may be charged into a rotary hollow container and mixed together therein. Alternatively, there may be adopted such a method in which after producing a composition containing the polyamide (B) and a high concentration of the anti-whitening agent, the thus produced resin composition is diluted with pellets of the polyamide (B) containing no anti-whitening agent to prepare a resin composition having a predetermined concentration of the anti-whitening agent, followed by melt-kneading the resultant diluted composition; or such a method in which after melt-kneading, the resultant resin composition is successively shaped by an injection-molding method, etc.

When using the anti-whitening agent, the barrier layer can be prevented from suffering from whitening immediately after production of the multilayer bottle. Further, even after being preserved for a long period of time under whitening-free or hardly-whitening conditions, the barrier layer can also be prevented from suffering from whitening. More specifically, even when the multilayer bottle that has been preserved for a long period of time under such conditions in which the bottle is free from whitening or hardly undergo whitening even without adding the anti-whitening agent thereto, e.g., at a temperature of 23° C. and a relative humidity of 50%, is exposed to a high humidity, contacted with water or boiled water or heated to a temperature higher than the glass transition temperature of the resins, the occurrence of whitening therein is inhibited similarly to immediately after molding.

The multilayer bottle of the present invention may be produced by the following procedure. That is, for example, using an injection molding machine equipped with two injection cylinders, the polyester (A) is injected from the skin-side injection cylinder, and a blended mixture of the polyamide (B) and the thermoplastic resin (C) is injected from the core-side injection cylinder, into a metal mold cavity through respective metal mold hot runners to produce a multilayer preform, and then the obtained multilayer preform is subjected to biaxial stretch blow molding by conventionally known methods to obtain the multilayer bottle.

In general, the multilayer preform may be blow-molded by conventionally known methods such as a so-called cold parison method and a so-called hot parison method. For example, there may be used the method in which after heating a surface of the multilayer preform to a temperature of 80 to 120° C., the multilayer preform is stretched in an axial direction thereof by a mechanical means such as a core rod insertion, and then a high-pressure air usually pressurized to from 2 to 4 MPa is blown into the multilayer preform to subject the preform to stretching and blow molding in a lateral direction thereof, or the method in which after crystallizing a mouth portion of the multilayer preform and heating a surface of the multilayer preform to a temperature of 80 to 120° C., the multilayer preform is subjected to blow molding in a metal mold heated to a temperature of 90 to 150° C.

In the present invention, the heating temperature of the preform is preferably from 90 to 1110° C. and more preferably from 95 to 108° C. When the heating temperature of the preform is 90° C. or higher, the barrier layer or the PET layer is prevented from undergoing cold stretching and whitening owing to sufficient heating. When the heating temperature of the preform is 110° C. or lower, the barrier layer is prevented from suffering from crystallization and whitening, and the resultant multilayer bottle is further prevented from being deteriorated in delamination resistance.

From the viewpoints of excellent barrier property and moldability, the multilayer bottle of the present invention preferably has a three-layer structure constructed successively from a polyester (A) layer, a barrier layer and a polyester (A) layer, or a five-layer structure constructed successively from a polyester (A) layer, a barrier layer, a polyester (A) layer, a barrier layer and a polyester (A) layer.

The multilayer bottle having a three-layer structure or a five-layer structure may be produced by subjecting a multilayer preform having a three-layer structure or a five-layer structure to biaxial stretch blow molding by conventionally known methods. The method of producing the multilayer preform having a three-layer structure or a five-layer structure is not particularly limited, and there may be used any suitable conventionally known methods. For example, using an injection molding machine having a skin-side injection cylinder for injecting the polyester (A) forming the innermost and outermost layers of the multilayer preform and a core-side injection cylinder for injecting the blended resin mixture forming the barrier layer, the polyester (A) is first injected from the injection molding machine, and then the blended resin mixture forming the barrier layer and the polyester (A) are injected at the same time from the injection molding machine, and further a necessary amount of the polyester (A) is injected therefrom to fill a cavity of the metal mold, thereby producing the multilayer preform having a three-layer structure constructed successively from a polyester (A) layer, a barrier layer and a polyester (A) layer.

Also, using the same injection molding machine as used above, the polyester (A) is first injected from the injection molding machine, and then the blended resin mixture forming the barrier layer solely is injected from the injection molding machine, and finally the polyester (A) is injected therefrom to fill the cavity of the metal mold, thereby producing the multilayer preform having a five-layer structure constructed successively from a polyester (A) layer, a barrier layer, a polyester (A) layer, a barrier layer and a polyester (A) layer.

Meanwhile, the method for production of the multilayer preform is not limited only to the above methods.

The thickness of the polyester (A) layer in the multilayer bottle is preferably from 0.01 to 1 mm, and the thickness of the barrier layer therein is preferably from 0.005 to 0.2 mm (from 5 to 200 μm). The thickness of the multilayer bottle is not necessarily constant over an entire part thereof, and is usually in the range of from 0.2 to 1.0 mm.

In the multilayer bottle obtained by subjecting the multilayer preform to biaxial stretch blow molding, the barrier layer may be provided at least in a barrel portion of the multilayer bottle in order to allow the bottle to exhibit a good gas-barrier property. However, when the barrier layer extends up to near a tip end of a mouth portion of the bottle, the gas-barrier property of the multilayer bottle can be further enhanced.

The weight percentage of the barrier layer in the multilayer bottle of the present invention is preferably from 1 to 20% by weight, more preferably from 2 to 15% by weight and still more preferably from 3 to 10% by weight on the basis of a total weight of the multilayer bottle. When the weight percentage of the barrier layer lies within the above-specified range, the resultant multilayer bottle exhibits a good gas-barrier property, and the multilayer preform as a precursor is readily molded into the multilayer bottle.

The multilayer bottle of the present invention is prevented from causing delamination even upon dropping or upon exposure to impact. In addition, the multilayer bottle has a large freedom of design without limitations to specific shapes with less irregularities or less bends owing to less occurrence of delamination even when the bottle is of such a shape having irregularities or bends. The multilayer bottle of the present invention is suitably used to store and preserve various products therein. Examples of the products stored or preserved in the multilayer bottle include liquid beverages such as carbonated beverage, juice, water, milk, sake, whisky, shochu, coffee, tea, jelly beverage and healthy beverage, seasonings such as liquid seasoning, sauce, soy sauce, dressing and liquid soup stock, liquid processed foodstuffs such as liquid soup, liquid drugs, beauty wash, milky lotion, hair dressing, hair dye, shampoo, etc.

EXAMPLES

The present invention will be described in more detail below with reference to the following examples and comparative examples. However, these examples are only illustrative and not intended to limit the invention thereto. Meanwhile, various properties of the multilayer bottle were evaluated by the following methods.

(1) Delamination Resistance

The delamination resistance of the multilayer bottle was evaluated by a height (cm) of delamination as measured by subjecting the bottle to drop test for containers according to ASTM D2463-95 Procedure B. The larger height of delamination indicates a higher delamination resistance. Specifically, first, the multilayer bottle to be tested was filled with water and capped, and then vertically dropped such that a bottom portion of the multilayer bottle was impinged against a floor, to visually observe occurrence of any delamination therein. The drop test was repeated while the drop height of the multilayer bottles was increased at intervals of 15 cm, and the minimum drop height at which the multilayer bottle suffered from delamination was determined as the height of delamination of the multilayer bottle. The number of the multilayer bottles subjected to the drop test was 30.

(2) Oxygen Transmission Rate (OTR)

The oxygen transmission rate (OTR) was measured at 23° C. and a relative humidity of 50% according to ASTM D3985 using a measuring apparatus "OX-TRAN 10/50A" available from Modern Controls Corp. Meanwhile, the OTR of the barrier layer was measured by separating and sampling only the barrier layer from the multilayer bottle. In the case where it was difficult to separate and sample the barrier layer solely from the bottle, the OTR of the barrier layer may be determined as follows. That is, a barrel portion of the bottle composed of the polyester (A) layers and the barrier layer is cut into a sheet, and the OTR of the barrier layer only is calculated from measured OTR of the sheet, thicknesses of the respective layers measured by a microscope, etc., and OTR of the polyester (A) layers separately measured. In addition, the OTR of the barrier layer only may also be calculated from OTR of the bottle, surface area of the bottle and thicknesses of the respective layers.

(3) Dispersing Condition of Thermoplastic Resin (C)

The barrier layer only was separated from a barrel portion of the multilayer bottle produced by blow molding, and embedded in an epoxy resin. After completion of curing of the epoxy resin, the multilayer bottle was vertically cut in a longitudinal direction (MD) thereof using an ultra-microtome "CR-X Power Tome XL" available from Boeckeler Instruments Corp., to prepare a test piece having a thickness of about 0.1 µm. The thus prepared test piece was picked up on a copper mesh and observed by a microscope. Meanwhile, the obtained ultrathin test piece was dyed with a vapor of ruthenium chloride, and observed to determine a dispersing condition of the thermoplastic resin (C) therein according to shade or contrast of dyeing. The microscopic observation was carried out by using a transmission electron microscope for surface observation "S4800" available from Hitachi Limited under the measuring conditions including an acceleration voltage of 30 kV, a current of 10 mA, a measuring magnification of 25,000 times and a TEM measuring mode.

Example 1

Under the following conditions, the raw resin materials were injection-molded to form a three-layer preform (27 g) constructed successively from a polyester (A) layer, a barrier layer and a polyester (A) layer. After cooling, the resultant preform was heated and subjected to biaxial stretch blow molding, thereby obtaining a multilayer bottle.
Polyester (A)
  Polyethylene terephthalate "RT543C" available from Nippon Unipet Co., Ltd.
  Intrinsic viscosity: 0.75 as measured at 30° C. in a mixed solvent containing phenol and tetrachloroethane at a weight ratio of 6/4.
Polyamide (B)
  Poly-m-xylyleneadipamide "MX Nylon S6007 (solid-state polymerization product)" available from Mitsubishi Gas Chemical Co., Inc.
  Number-average molecular weight: 23500
  Relative viscosity: 2.70 as measured at 25° C. in a solution prepared by dissolving 1 g of the resin in 100 mL of 96% sulfuric acid.
  Flexural modulus: 4.5 GPa (ASTM D790)
Thermoplastic Resin (C)
  Phenoxy resin "Grade PKHB" available from InChem. Corp.
  Number-average molecular weight: 9500
  Glass transition point (Tg): 84° C.
  Flexural modulus: 2.9 GPa (ASTM D790)
Polyamide (B)/Thermoplastic Resin (C)
  95/5 (weight ratio)
Shape of Three-Layer Preform
  Whole length: 95 mm; outer diameter: 22 mm; wall thickness: 4.2 mm
  The three-layer preform was produced using an injection molding machine (Model: "M200"; four-shot molding type) available from Meiki Seisakusho Co., Ltd.
Molding Conditions for Three-layer Preform:
  Skin-side injection cylinder temperature: 280° C.
  Core-side injection cylinder temperature: 260° C.
  Mold runner temperature: 280° C.
  Mold cooling water temperature: 15° C.
  Proportion of barrier resin in preform: 5% by weight
Shape of Multilayer Bottle
  Whole length: 223 mm; outer diameter: 65 mm; capacity: 500 mL; bottom shape: champagne shape; no dimples in a barrel portion.
  Meanwhile, the biaxial stretch blow molding was performed by using a blow molding machine (Model: "EFB100ET") available from Frontier Inc.
Conditions of Biaxial Stretch Blow Molding
  Heating temperature of preform: 108° C.
  Pressure applied to stretching rod: 0.5 MPa
  Primary blow pressure: 1.1 MPa
  Secondary blow pressure: 2.5 MPa
  Primary blow retardation time: 0.34 s
  Primary blow time: 0.30 s
  Secondary blow time: 2.0 s
  Blow evacuation time: 0.6 s
  Mold temperature: 30° C.

The weight percentage of the barrier layer was 5% by weight on the basis of a total weight of the resultant multilayer bottle. The results of evaluation of the multilayer bottle are shown in Table 1.

Examples 2 to 8 and Comparative Examples 1 to 3

The same procedure as in Example 1 was repeated except that the composition of the barrier layer was changed to those shown in Tables 1 to 3, thereby obtaining multilayer bottles. The results of evaluation of the thus obtained multilayer bottles are shown in Tables 1 to 3.

The meanings of abbreviations of resins shown in Tables 1 to 3 are as follows.
(1) 6007
  Poly-m-xylyleneadipamide "MX Nylon S6007" (solid-state polymerization product) available from Mitsubishi Gas Chemical Co., Inc.
  Number-average molecular weight: 23500
  Relative viscosity: 2.70
  Flexural modulus: 4.5 GPa
(2) 6121
  Poly-m-xylyleneadipamide "MX Nylon S6121" (solid-state polymerization product) available from Mitsubishi Gas Chemical Co., Inc.
  Number-average molecular weight: 40000
  Relative viscosity: 3.94
  Flexural modulus: 4.5 GPa
(3) PKHB
  Phenoxy resin "Grade PKHB" available from InChem Corp.
  Number-average molecular weight: 9500
  Glass transition point (Tg): 84° C.
  Flexural modulus: 2.9 GPa
(4) PKFE
  Phenoxy resin "Grade PKFE" available from InChem Corp.
  Number-average molecular weight: 16000
  Glass transition point (Tg): 98° C.
  Flexural modulus: 2.9 GPa
(5) Oligomer
  Polyamide oligomer produced by polycondensing m-xylylenediamine with adipic acid
  Number-average molecular weight: 5000
  Flexural modulus: 3.5 GPa
(6) 1015B
  Nylon 6 "Grade: 1015B" available from Ube Kosan Co., Ltd.

Number-average molecular weight: 15000
Flexural modulus: 2.5 GPa (7) 2015B

Nylon 66 "Grade: 2015B" available from Ube Kosan Co., Ltd.

Number-average molecular weight: 15300
Relative viscosity: 2.5
Flexural modulus: 3.0 GPa (8) 2020B Nylon 66 "Grade: 2020B" available from Ube Kosan Co., Ltd.

Number-average molecular weight: 19800
Relative viscosity: 2.9
Flexural modulus: 3.0 GPa The relative viscosity and the flexural modulus were measured by the same methods as described above.

TABLE 1

|  | Examples | | | |
| --- | --- | --- | --- | --- |
|  | 1 | 2 | 3 | 4 |
| Resins for barrier layer | | | | |
| Polyamide (B) | 6007 | 6007 | 6007 | 6121 |
| Thermoplastic resin (C) | PKHB | PKHB | Oligomer | PKFE |
| Resin (D) | — | — | — | — |
| Composition of barrier layer (wt %) | | | | |
| Polyamide (B) | 95 | 90 | 93 | 93 |
| Thermoplastic resin (C) | 6 | 10 | 7 | 7 |
| Resin (D) | — | — | — | — |
| Mn of thermoplastic resin (C)/Mn of polyamide (B) [1] (%) | 40 | 40 | 21 | 41 |
| Mn of resin (D)/Mn of polyamide (B) [1] (%) | — | — | — | — |
| Modulus of thermoplastic resin (C)/Modulus of polyamide (B) (%) | 64 | 64 | 78 | 64 |
| Dispersing condition of thermoplastic resin (C) | | | | |
| Area ($\mu m^2$) | 0.016 | 0.024 | — | 0.022 |
| Major axis ($\mu m$) | 0.364 | 0.523 | — | 0.440 |
| Minor axis ($\mu m$) | 0.055 | 0.058 | — | 0.061 |
| Delamination resistance (cm) | 300 | 325 | 270 | 307 |
| OTR of barrier layer (cc · mm/($m^2$ · day · atm)) | 0.009 | 0.008 | 0.010 | 0.009 |

Note
[1] Mn: Number-average molecular weight

TABLE 2

|  | Examples | | | |
| --- | --- | --- | --- | --- |
|  | 5 | 6 | 7 | 8 |
| Resins for barrier layer | | | | |
| Polyamide (B) | 6121 | 6007 | 6121 | 6007 |
| Thermoplastic resin (C) | PKHB | 2015B | 2015B | 1015B |
| Resin (D) | — | — | — | 2020B |
| Composition of barrier layer (wt %) | | | | |
| Polyamide (B) | 97 | 90 | 90 | 90 |
| Thermoplastic resin (C) | 3 | 10 | 10 | 6.7 |
| Resin (D) | — | — | — | 3.3 |
| Mn of thermoplastic resin (C)/Mn of polyamide (B) [1] (%) | 24 | 64 | 38 | 64 |
| Mn of resin (D)/Mn of polyamide (B) [1] (%) | — | — | — | 85 |
| Modulus of thermoplastic resin (C)/Modulus of polyamide (B) (%) | 64 | 64 | 64 | 56 |
| Dispersing condition of thermoplastic resin (C) | | | | |
| Area ($\mu m^2$) | 0.016 | 0.045 | 0.032 | 0.020 |
| Major axis ($\mu m$) | 0.298 | 0.584 | 0.439 | 0.400 |
| Minor axis ($\mu m$) | 0.067 | 0.070 | 0.065 | 0.060 |
| Delamination resistance (cm) | 303 | 240 | 260 | 318 |
| OTR of barrier layer (cc · mm/($m^2$ · day · atm)) | 0.009 | 0.014 | 0.013 | 0.011 |

Note
[1] Mn: Number-average molecular weight

TABLE 3

|  | Comparative Examples | | |
|---|---|---|---|
|  | 1 | 2 | 3 |
| Resins for barrier layer | | | |
| Polyamide (B) | 6007 | 6007 | 6007 |
| Thermoplastic resin (C) | — | — | — |
| Resin (D) | — | PKFE | 2020B |
| Composition of barrier layer (wt %) | | | |
| Polyamide (B) | 100 | 90 | 90 |
| Thermoplastic resin (C) | — | — | — |
| Resin (D) | — | 10 | 10 |
| Mn of thermoplastic resin (C)/Mn of polyamide (B) [1] (%) | — | — | — |
| Mn of resin (D)/Mn of polyamide (B) [1] (%) | — | 68 | 85 |
| Modulus of thermoplastic resin (C)/Modulus of polyamide (B) (%) | — | — | — |
| Dispersing condition of thermoplastic resin (C) | | | |
| Area ($\mu m^2$) | — | 0.054 | 0.060 |
| Major axis ($\mu m$) | — | 0.680 | 0.710 |
| Minor axis ($\mu m$) | — | 0.094 | 0.092 |
| Delamination resistance (cm) | 150 | 92 | 150 |
| OTR of barrier layer (cc · mm/($m^2$ · day · atm)) | 0.010 | 0.010 | 0.015 |

Note
[1] Mn: Number-average molecular weight

As shown in the above Examples and Comparative Examples, it was confirmed that the multilayer bottles of the present invention exhibited a very excellent delamination resistance, whereas the bottles incapable of satisfying the requirements of the present invention were deteriorated in delamination resistance.

INDUSTRIAL APPLICABILITY

In accordance with the present invention, it is possible to produce a multilayer bottle having an enhanced freedom of container shape and an excellent gas barrier property since the bottle is substantially free from delamination. Thus, the present invention is largely valuable from industrial viewpoints.

The invention claimed is:

1. A multilayer bottle comprising an outermost layer, an innermost layer and at least one barrier layer interposed between the outermost layer and the innermost layer, wherein the outermost layer and the innermost layer are each made mainly of a polyester (A) obtained by polymerizing a dicarboxylic acid component containing 80 mol % or more of terephthalic acid with a diol component containing 80 mol % or more of ethylene glycol; and the barrier layer comprises at least a polyamide (B) obtained by polycondensing a diamine component containing 70 mol % or more of m-xylylenediamine with a dicarboxylic acid component containing 70 mol % or more of an α,ω-linear aliphatic dicarboxylic acid having 4 to 20 carbon atoms, and a thermoplastic resin (C) whose number-average molecular weight is from 10 to 65% of a number-average molecular weight of the polyamide (B), wherein the thermoplastic resin (C) is selected from the group consisting of a phenoxy resin, a polyglycolic acid, and a polyamide.

2. The multilayer bottle according to claim 1, wherein a content of the thermoplastic resin (C) in the barrier layer is from 1 to 20% by weight on the basis of a weight of the barrier layer.

3. The multilayer bottle according to claim 1, wherein the number-average molecular weight of the polyamide (B) is from 18000 to 43500.

4. The multilayer bottle according to claim 1, wherein a ratio of a flexural modulus of the thermoplastic resin (C) to a flexural modulus of the polyamide (B) is from 30 to 80% when both the flexural moduli are measured according to ASTM D790.

5. The multilayer bottle according to claim 1, wherein the thermoplastic resin (C) is a phenoxy resin in the form of a polyhydroxy ether having an α-glycol group at a terminal end thereof.

6. The multilayer bottle according to claim 1, wherein the thermoplastic resin (C) is a polyglycolic acid.

7. The multilayer bottle according to claim 1, wherein individual domains of the thermoplastic resin (C) dispersed in the barrier layer have a shape satisfying the following requirements (1) to (3) as viewed in a section of the barrier layer:

$$\text{Area(average value)} < 0.054\, \mu m^2 \tag{1}$$

$$\text{Major axis(average value)} < 0.6\, \mu m \tag{2}$$

$$\text{Minor axis(average value)} < 0.09\, \mu m \tag{3}$$

8. The multilayer bottle according to claim 1, wherein the multilayer bottle has a three-layer structure successively comprising a layer of the polyester (A), the barrier layer and a layer of the polyester (A).

9. The multilayer bottle according to claim 1, wherein the multilayer bottle has a five-layer structure successively comprising a layer of the polyester (A), the barrier layer, a layer of the polyester (A)), the barrier layer and a layer of the polyester (A).

10. The multilayer bottle according to claim 1, wherein a weight percentage of the barrier layer is from 1 to 20% by weight on the basis of a total weight of the multilayer bottle.

11. The multilayer bottle according to claim 1, wherein the thermoplastic resin (C) is a polyamide.

12. The multilayer bottle according to claim 11, wherein the polyamide as the thermoplastic resin (C) is a polyamide oligomer or a low-molecular weight polyamide which is obtained by polycondensing a diamine component containing 70 mol % or more of m-xylylenediamine with a dicarboxylic acid component containing 50 mol % or more of an α,ω-linear aliphatic dicarboxylic acid having 4 to 20 carbon atoms.

* * * * *